United States Patent
Gerphagnon et al.

(10) Patent No.: US 10,564,821 B2
(45) Date of Patent: Feb. 18, 2020

(54) SCREEN COPYING METHOD

(71) Applicant: BULL SAS, Les Clayes Sous Bois (FR)

(72) Inventors: Jean-Olivier Gerphagnon, Vif (FR); Liana Bozga, Meylan (FR); David Enguehard, Fontenay aux Roses (FR)

(73) Assignee: BULL SAS, Les Clayes Sous Bois (FR)

( * ) Notice: Subject to any disclaimer, the term of this patent is extended or adjusted under 35 U.S.C. 154(b) by 178 days.

(21) Appl. No.: 15/496,013

(22) Filed: Apr. 25, 2017

(65) Prior Publication Data
US 2017/0308388 A1 Oct. 26, 2017

(30) Foreign Application Priority Data
Apr. 26, 2016 (FR) .................................. 16 53682

(51) Int. Cl.
| | | |
|---|---|---|
| *G06F 3/048* | (2013.01) | |
| *G06F 3/0484* | (2013.01) | |
| *G06F 9/451* | (2018.01) | |
| *G06F 16/95* | (2019.01) | |

(52) U.S. Cl.
CPC .......... *G06F 3/04842* (2013.01); *G06F 9/451* (2018.02); *G06F 16/95* (2019.01)

(58) Field of Classification Search
None
See application file for complete search history.

(56) References Cited

U.S. PATENT DOCUMENTS

| | | | |
|---|---|---|---|
| 7,899,829 B1 | 3/2011 | Malla | |
| 9,098,597 B2* | 8/2015 | Matas | ............... G06F 17/30905 |
| 2011/0202854 A1 | 8/2011 | Chan et al. | |
| 2014/0123018 A1* | 5/2014 | Park | ...................... G06F 3/0484 |
| | | | 715/738 |
| 2014/0317483 A1 | 10/2014 | Wang | |
| 2015/0128017 A1* | 5/2015 | Fithian | ................ G06F 17/2235 |
| | | | 715/205 |

OTHER PUBLICATIONS

FR Search Report, dated Feb. 6, 2017, from corresponding FR application.

* cited by examiner

*Primary Examiner* — Thanh T Vu
(74) *Attorney, Agent, or Firm* — Young & Thompson

(57) ABSTRACT

A screen copying method including the copying, in the form of an image file, of a portion of an image displayed on a screen where a user graphically selects the image portion, the copying of the selected image portion automatically resulting in: the copying of the pointer or pointers associated with the image portion along with the coordinates of the pointers in the image portion, the pointers respectively pointing to objects; and the maintaining of the respective links between the pointers and the coordinates so that, during a subsequent redisplay of the image portion on a screen, the graphical selection of a point corresponding to one of the coordinates by a user automatically activates the pointer corresponding to the coordinate of the selected point and brings up the object corresponding to the activated pointer.

11 Claims, 3 Drawing Sheets

SCREEN COPYING METHOD

FIELD OF THE INVENTION

The invention relates to a screen copying method. A screen copying method allows copying all or a portion of what is displayed on a screen in order to be able to redisplay the resulting image on a screen at a later time, whether on the same screen as the one where the initially obtained image was displayed or another screen.

BACKGROUND OF THE INVENTION

According to a first prior art, there is a known screen copying method in which a simple screenshot is captured. The image displayed on the screen is saved, but only as a simple copy of what is visible on the screen, without any additional elements. However, some elements presented on the screen are enriched with links pointing to other images or other objects. In such a simple screenshot, only the displayed image as visible on the screen is saved, the additional elements possibly enriching the displayed image with live links being permanently lost during this save. The visible image of the link is thus saved but not its functionality, meaning that during a subsequent redisplay of this saved image, the link is also redisplayed but is no longer live, and the object associated with this link has been totally lost.

Thus, when capturing a screenshot, whether total or only partial in which case it is called a screen portion, the generated output is raw data in a standard image format, for example JPEG or PNG. This image format contains a set of pixel-related information that enables reconstruction of an image on the screen by displaying this image when the file storing this image is opened.

This means that the screenshot, for example of a web page (Internet) or of another document containing links that are pointers, does not allow preserving these links and therefore provides only a simple still image devoid of information other than pixels, which means it has lost any additional elements which could have enriched this simple image.

With a captured screenshot all link or pointer elements are therefore logically lost. As a result, it is impossible for example to find, from a screenshot, the source of the information contained in the screenshot.

This simple screenshot only has the color, or if appropriate the grayscale, of the set of points of the displayed image, these points being called pixels, without adding any information other than these simple colors or grayscales. In summary, this screenshot can be considered akin to a simple copy of a raw image as would be taken by a camera.

According to a second prior art, there is a known file copying method in which the entire file storing the displayed image will be saved. However, this file is not saved in an image file format. It is not possible to select only a portion, or at least not possible to select a portion graphically, for example by graphically selecting this portion of the image directly on the displayed image; it is therefore even less possible to use this image portion directly and independently, either alone or in combination with another document in which it would be integrated for example.

This second prior art provides only a simple functionality corresponding to a simple "Save as" of a Web page or other document that is a text document for example, without allowing the selection of a portion of this web page or this other text document when the latter contains links or pointers. Thus, for example, if the user wishes to capture a table which is placed in a web page and which contains pointers to other pages, the user cannot select this table and thus obtain a data set allowing integration of this table into other documents, for example an email or text presentation and/or graphical presentation. This second prior art also requires other software which is able to reread the obtained file.

SUMMARY OF THE INVENTION

The object of the present invention is to provide a screen copying method that at least partially overcomes the aforementioned disadvantages.

More particularly, the aim of the invention is to provide a screen copying method which offers the dual advantages of being able to capture a screenshot in a simple manner, in other words to copy an image displayed on a screen, not only for the image displayed on the screen but also for only a portion of this image that is graphically selected on the screen where the corresponding image is displayed, and also of being able to save in a simple manner some or all of the additional elements that may enrich the displayed image and which are lost in a conventional screenshot.

For this purpose, the invention proposes capturing a screenshot of all or a portion of a displayed image, including the possibility of copying only an image portion that is graphically selected, with the copying of pointers or other links included in the selected portion of the displayed image, as well as the maintaining of the association between the pointers and their relative coordinates in the displayed image portion, so that during a subsequent display of the captured image portion, live pointers are displayed at the correct locations in the redisplayed image portion. In particular, the geographical correspondence between pointers and image pixels is maintained between the displayed and captured image portion and the redisplayed image portion, thus enabling the user to benefit from the enrichments in the captured image portion which are redisplayed under the same conditions as in the initial display of the image portion.

A relative coordinate is a coordinate with respect to the captured and then redisplayed image portion, not an absolute coordinate in the reference system of the screen where the image was originally displayed. A relative coordinate is, for example, the middle of the height and a quarter of the length starting from the left in the redisplayed image portion, while an absolute coordinate is, for example, 15 pixels from the top edge of the screen and 20 pixels from the left edge of the screen. A relative coordinate allows maintaining the correct position of a pointer in the captured image portion even if it is redisplayed with a different size and at a different location than in its initial display as captured on the screen.

According to preferred embodiments, the invention proposes preserving the coupling which makes it possible, during a screen capture, to obtain both the image of what one wishes to capture but also all of the hyperlinks, thus offering an enriched or dynamic image, meaning it is capable of changing by offering additional content when the user requests it, which is not the case with images redisplayed after a simple and conventional screenshot of the first prior art described above.

According to preferred embodiments, the invention proposes enriching the simple screenshot solution by adding information relating to the screenshot context and also the associated links. This makes it possible, for example when capturing a web page which includes links to other pages or websites, to keep these links in the captured image intended for redisplay in order to allow access to these other pages and sites and use them.

To do this, during the improved screen capture, it is not a simple still image that is generated, for example of the PNG or JPGEG standard, but an enhanced image file that integrates, in a structured format, data concerning additional elements such as links. These additional data, called metadata, could be stored in a specific area of the standard image file in a standardized format such as XML.

To this end, the present invention provides a screen copying method comprising the copying, in the form of an image file, of a portion of an image displayed on a screen where the user graphically selects that image portion, said copying of the selected image portion automatically resulting in: the copying of the pointer or pointers associated with that image portion along with the coordinates of these pointers in that image portion, the pointers respectively pointing to objects; and the maintaining of the respective links between the pointers and the coordinates so that, during a subsequent redisplay of the image portion on a screen, the graphical selection of a point corresponding to one of these coordinates by a user automatically activates the pointer corresponding to the coordinate of the selected point and brings up the object corresponding to the activated pointer.

A copied or displayed image is understood to mean a copied or displayed screen portion, not a file format. Image file is understood to mean a file format. The copied or displayed image may correspond to different formats, for example to an image that is an object in an image file format, text, a video, a photo, a combination of the preceding elements, etc.

According to preferred embodiments, the invention comprises one or more of the following features which may be used individually or in partial combination or in total combination.

Preferably, after selection of that image portion by a user, the pointers and their coordinates are identified and copied while traversing all coordinates of that selected image portion.

Thus, the set of links contained in the selected image portion, as well as the set of additional elements that enrich the selected image portion and to which these links point, can be saved by means of a simple and systematic process.

The information relating to the link at a pixel or at a coordinate is known to the operating system, more specifically to the graphical user interface manager which is an application that sits above the operating system. Consequently, all coordinates of the selected image portion will therefore be traversed when copying the screen, at which time the metadata, in particular the hypertext links, corresponding to these coordinates are copied.

Preferably, the pointers, their coordinates, and their respective links are copied as metadata integrated into the structure of the image file containing the selected image portion.

Thus, one complete file contains the captured and enriched image. Its management is thus simpler and its circulation in a computer network is easier and more secure.

In this case, the additional information, for example pointers, is added to the structure of the image file as metadata, since certain image file formats allow the addition of supplemental information. Preferably, it will be integrated within a graphical file format allowing the addition of these metadata, in particular the hyperlink information, directly within the image file. This integration offers both transparency for the user, as the user only has to manipulate or transfer one file, and compatibility with all existing graphical tools, either in a standard format in the case of already existing tools related to image files, or with a specific tool for using the metadata added to these image files.

In a preferable alternative, the pointers, their coordinates, and their respective links are copied in the form of metadata external to the structure of the image file containing the selected image portion.

The improved image capture operation can thus be accomplished more simply. However, manipulation and transfer of the resulting ensemble will be less straightforward than in the case of a single file. An example of a file structure that is external to the image file and that integrates the metadata is, for example, an XML file.

The storage of this additional information will then occur in a file separate from the standard graphical file, which is for example a JPEG or GIF or PNG file, in order to preserve compatibility with existing graphic processing tools. In this case, a particular structure is defined in order to establish the link between relative coordinates in the image and the corresponding pointers, for example corresponding hypertext links. The image and the metadata, for example links, which are associated with the various points of the image or captured image portion are thus saved.

Preferably, the pointers, their coordinates, and their respective links are known to the graphical user interface manager which is able to display the copied image portion on a screen.

Thus, when the image portion initially displayed and then saved is redisplayed, this graphical user interface manager can simultaneously redisplay the associated pointers directly at the correct locations in the redisplayed image, without requiring any additional operation intended to communicate the necessary information to the graphical user interface manager.

Then, when the user clicks on a point in the redisplayed image portion, meaning on a relative coordinate of the image, where a hypertext link is located, the graphical system is informed that a hypertext link also exists in the redisplayed image portion, which enables opening the link whose position corresponds to this relative coordinate. This link is opened via a Web browser in the case of a Web page, or via a word processing or graphical presentation application if it is a local link to a file or a link to a server. This communication occurs between the application that can read the improved capture or improved copy and the graphical user interface manager.

Preferably, the pointers are hyperlinks. The pointers may also be, for example, hyperlinks in the broadest sense of any type with target protocols such as HTTP, DAV, FTP, or may be other types of elements.

The representation of elements on a screen, and more specifically the links that are referred to in general as hyperlinks but in fact may have the form of an image, an animation, a video, correspond in fact to coordinates in a space. An action of the user at these coordinates, for example a mouse click, will activate the link or the corresponding pointer, which will access the destination of the corresponding link or pointer and thus will enable the user to access the object or document associated with that link or pointer.

Preferably, the objects are respectively other images to be displayed or other image portions to be displayed.

Thus, this improved copy or improved capture makes it possible to save and redisplay several successive nested images, each of the images being displayed by activation of the corresponding pointer that is displayed on another image.

Preferably, only a portion of the displayed image is copied, not the entire displayed image. What is copied corresponds to strictly less than the entire image.

Thus, in the case of a selected image portion, as the second prior art presented does not apply at all, the invention is of even more interest because there is no prior art proposing an improved capture of only a portion of the image.

Preferably, the graphical selection of the image portion by a user is a capture by this user of a portion of a screen displaying the selected image portion.

Preferably, the image file is in a format that can be directly integrated into another document, in particular a presentation or e-mail, by the graphical user interface manager or by another application that will advantageously be an application external to the operating system.

Thus, the copied or captured image portion, even when enriched with additional elements, can be directly and simply used or reused by the user.

Preferably, this image file contains the color or the grayscale of each pixel of the copied image portion. This color or grayscale constitutes the information displayed at any point of the image and captured image portion, the additional elements generally only being present at certain points of the image and captured image portion.

Preferably, during a subsequent redisplay of the image portion on a screen, a mapping between the copied coordinates and the new coordinates of the redisplay is established, if necessary integrating the change in position on the screen of the image portion and the enlargement or reduction of the image portion.

Thus, the captured or copied image portion can be readily redisplayed and reused regardless of the redisplay conditions and regardless of the configuration of the screen on which the copied image portion is redisplayed, even if this image portion is redisplayed on a different screen than the one on which it was captured.

Next, when opening the file containing information on the links in the copied image portion, a tool reads the information on these links and calculates their coordinates in the image portion based on their position on the screen, which may not be the same as when the screen was copied due to a different resolution or a presentation within a window for example, and based on a possible enlargement or reduction of the redisplayed image portion relative to its initial display before copying.

Preferably, during the graphical selection by the user of a point in the redisplayed image portion, the application reading the image file informs the graphical user interface manager redisplaying the image portion or another application redisplaying the image portion, of the existence of a pointer associated with the selected point.

Thus, by simple graphical selection of the position of a pointer on the redisplayed image portion, the user can activate this pointer and access the object corresponding to the activated pointer, just as in the initial display of the image.

The invention also relates to the use of a computer program to copy a screen according to the screen copying method of the invention described above.

The invention further relates to a computer program product comprising program code instructions stored on a computer-readable medium, comprising computer-readable programming means for copying a screen according to the screen copying method of the invention when said program is run on a computer.

Other features and advantages of the invention will be apparent from reading the following description of a preferred embodiment of the invention, given by way of example and with reference to the accompanying drawings.

DETAILED DESCRIPTION OF THE INVENTION

Figure 1:
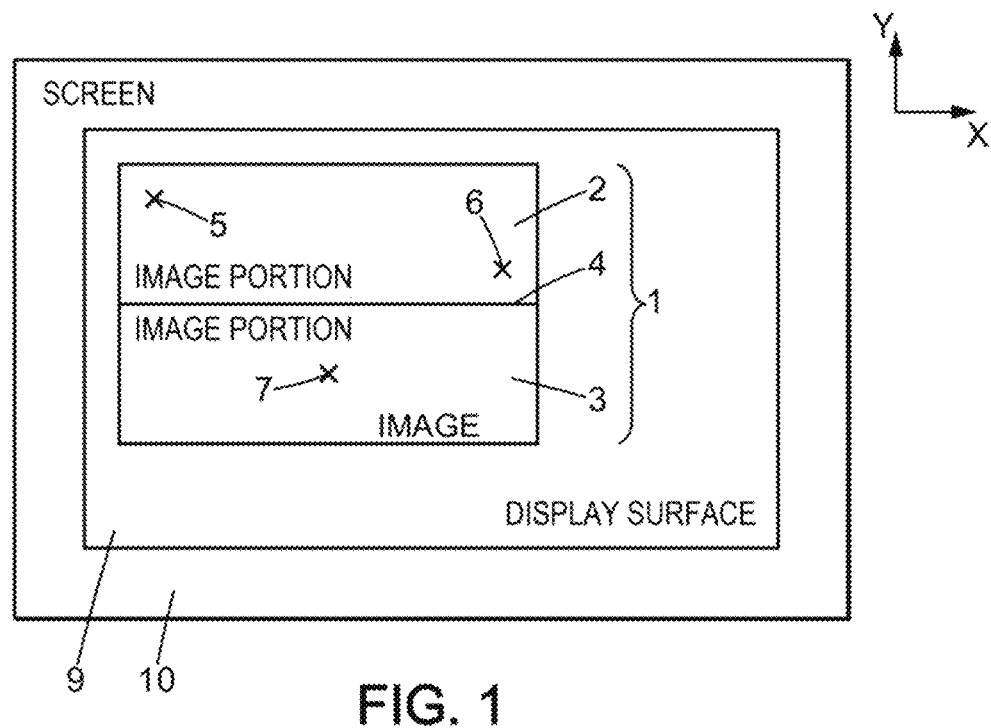
FIG. 1 schematically represents an example of an on-screen display corresponding to the initial display prior to the screen copying method according to one embodiment of the invention.

FIG. 1 schematically represents an example of an on-screen display corresponding to the initial display prior to the screen copying method according to one embodiment of the invention.

A screen 10 has a display surface 9 on which an image 1 is initially displayed. An XY reference system allows defining a coordinate system for all points of this displayed image 1.

The user wants to choose a portion 2 of the displayed image 1 because this image portion 2 is of interest to the user, while the user is not interested in the remainder of the displayed image 1, meaning portion 3 of the image 1. Image portion 2 contains additional elements, for example pointers 5 and 6, respectively located near the upper left and lower right corners of image portion 2. Image portion 3 contains one additional element, for example a pointer 7 located in the middle of image portion 3.

Figure 5:
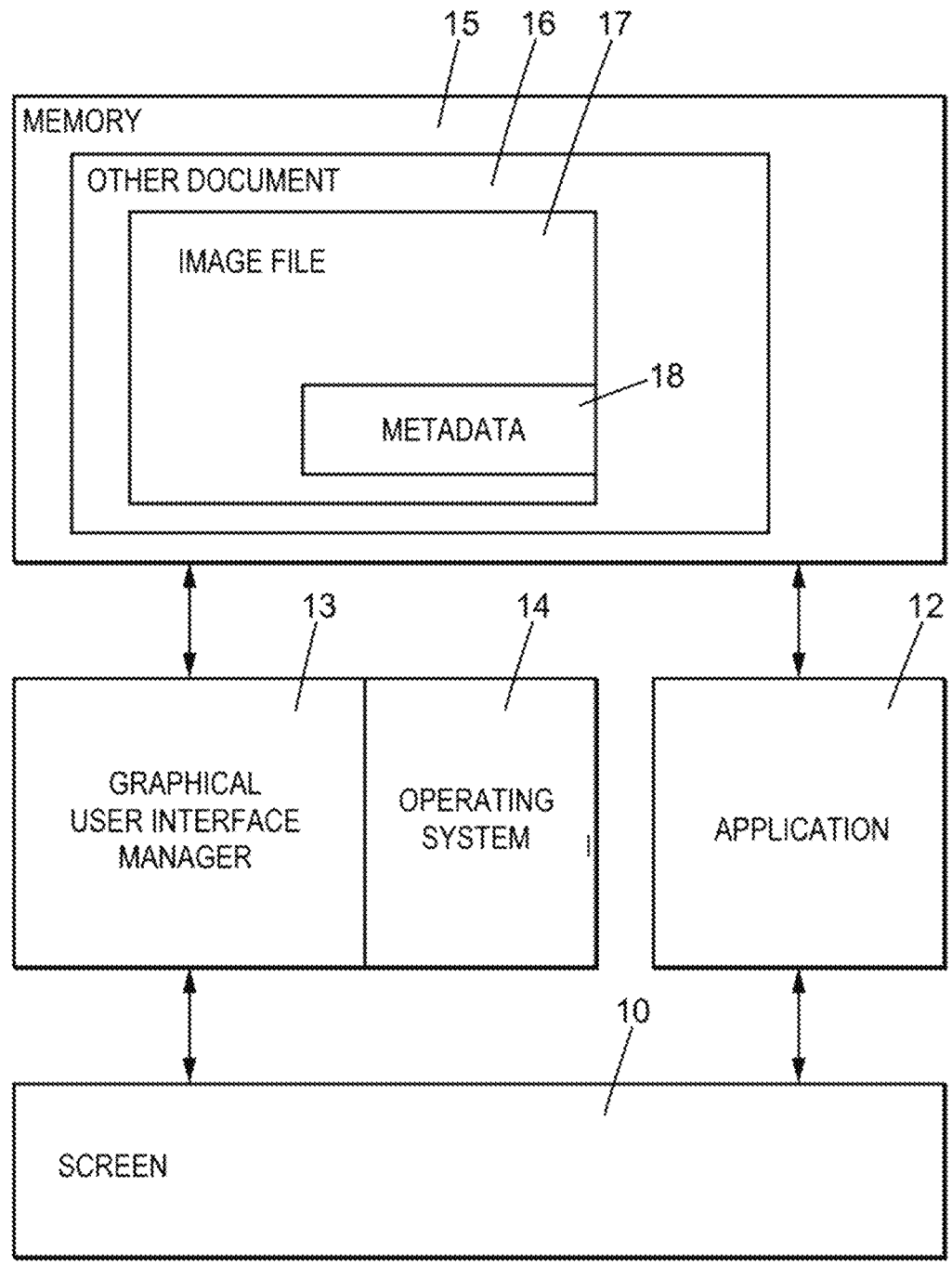
FIG. 5 schematically represents an illustrative communication between the various elements of a computer system implementing the initial display, the screen copying method according to one embodiment of the invention, and the subsequent redisplay, of a copied image portion.

The user graphically selects image portion 2 inside the displayed image 1, by means of a graphical selection box 4, for example using a mouse associated with the screen but not shown in FIG. 1 for reasons of clarity and simplicity. When the selection box 4 is confirmed, for example by means of a corresponding mouse click, the image portion 2 graphically selected on the screen 10, or more precisely on the display surface 9 of the screen 10, is stored in memory as represented in FIG. 5 described further below.

Figure 2:
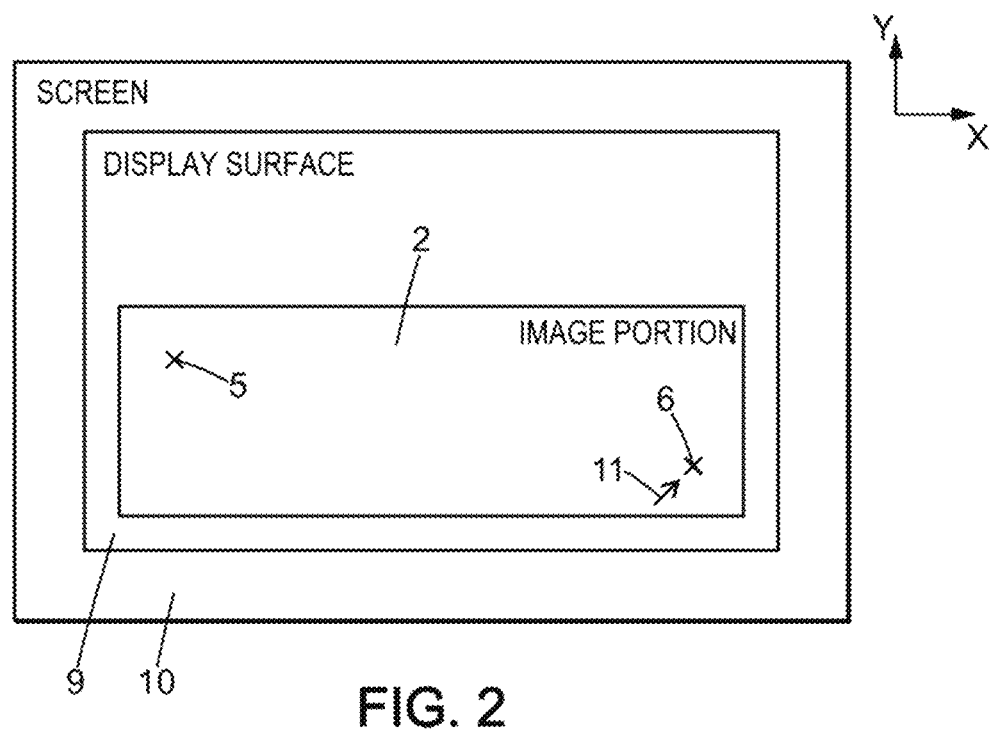
FIG. 2 schematically represents an example of an on-screen display corresponding to the screen copying method according to one embodiment of the invention.

FIG. 2 schematically represents an example of an on-screen display corresponding to the screen copying method according to one embodiment of the invention.

In the displayed image 1, only the upper portion 2 of the image has been saved, the pointers 5 and 6 also having been saved, the lower portion 3 of the image not having been saved and pointer 7 not having been saved either.

The user chooses to redisplay on the screen 10, or more precisely on the display surface 9 of the screen 10, the image portion 2 that has been saved or copied. Since the configuration of the screen 10 is different from the screen during the save, the copied image portion 2 is redisplayed at another location on the screen 10 and with a different size than during its initial display on the screen just before it was saved. When the image portion 2 was initially displayed and copied, it was small in size at the top of the screen 10 and offset towards the left of the screen 10. The previously copied image portion 2 is redisplayed in an enlarged size on the screen 10, at the bottom of the screen 10 and horizontally centered in the middle of the screen 10.

The relative position of pointers 5 and 6 in relation to the copied image portion 2 has not changed. Pointer 5 is displayed at the upper left corner of the image portion 2, on the same part of the image portion 2 if pointer 5 is a region, or on the same point if pointer 5 is a point, as it was in FIG. 1. Similarly, pointer 6 is displayed in the lower right corner of the image portion 2, on the same part of the image portion 2 if pointer 6 is a region, or on the same point if pointer 6 is a point, as it was in FIG. 1.

Bringing the cursor 11 to pointer 6, said cursor 11 being represented in FIG. 2 by a selection arrow whose movement on the display surface 9 of the screen 10 is controlled, for example, by a mouse not shown in FIG. 2 for reasons of clarity and simplicity, the user can then activate pointer 6, for example by clicking the mouse. This activation of pointer 6 will cause the display of an object, for example another image or text or a video or something else, on the screen 10, and possibly on a subportion of the redisplayed image portion 2 as explained in relation to FIGS. 3 and 4 which represent two alternatives for displaying the object corresponding to pointer 6 which was located in the redisplayed image portion 2 and which was activated by the user.

Figure 3:
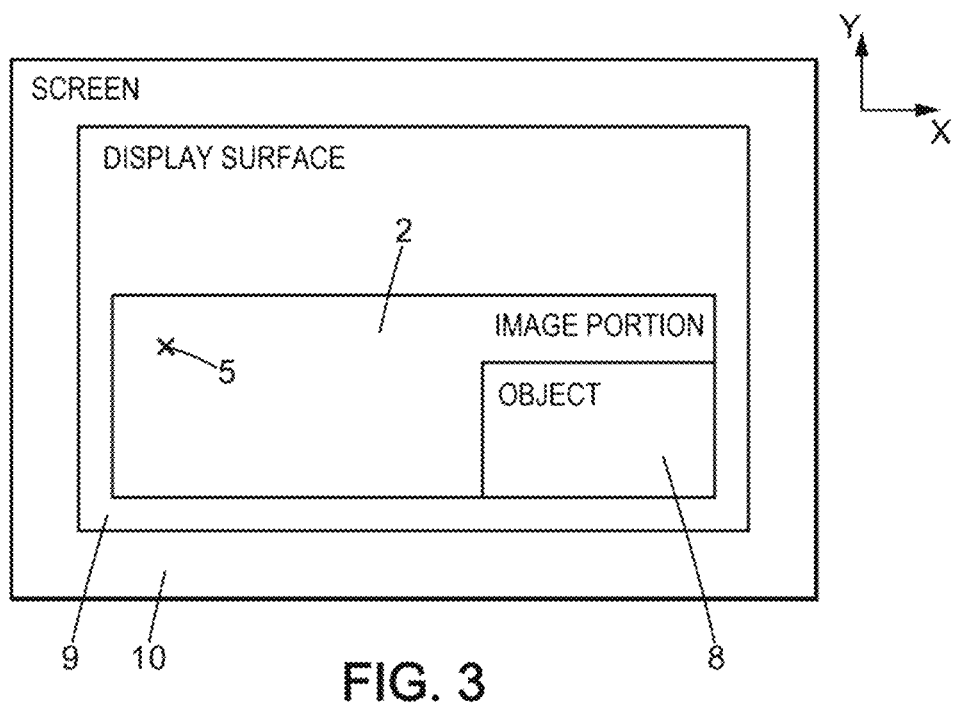
FIG. 3 schematically represents an example of an on-screen display corresponding to a first alternative of a redisplay subsequent to the screen copying method according to one embodiment of the invention.

FIG. 3 schematically represents an example of an on-screen display corresponding to a first alternative of a redisplay subsequent to the screen copying method according to one embodiment of the invention.

After activation of pointer 6, the image portion 2 redisplayed on the screen 10 has not moved, nor has pointer 5 located in the upper left corner of the image portion 2. However, pointer 6 has disappeared and an object 8 has been displayed at the location where pointer 6 had been located, for example in the form of a sub-portion of the redisplayed image portion 2.

This object 8 corresponds to pointer 6 and is associated with it. This object 8 may be another image, text, a video, or some other element. This object 8 can be viewed by the user, and can also be used by the user who could for example activate another pointer (by clicking on it for example), located in the subportion 8 of the displayed image portion 2, not shown for reasons of clarity and simplicity in FIG. 3, so as to display yet another object not shown for reasons of clarity and simplicity in FIG. 3, and possibly continuing in a successive manner.

Figure 4:
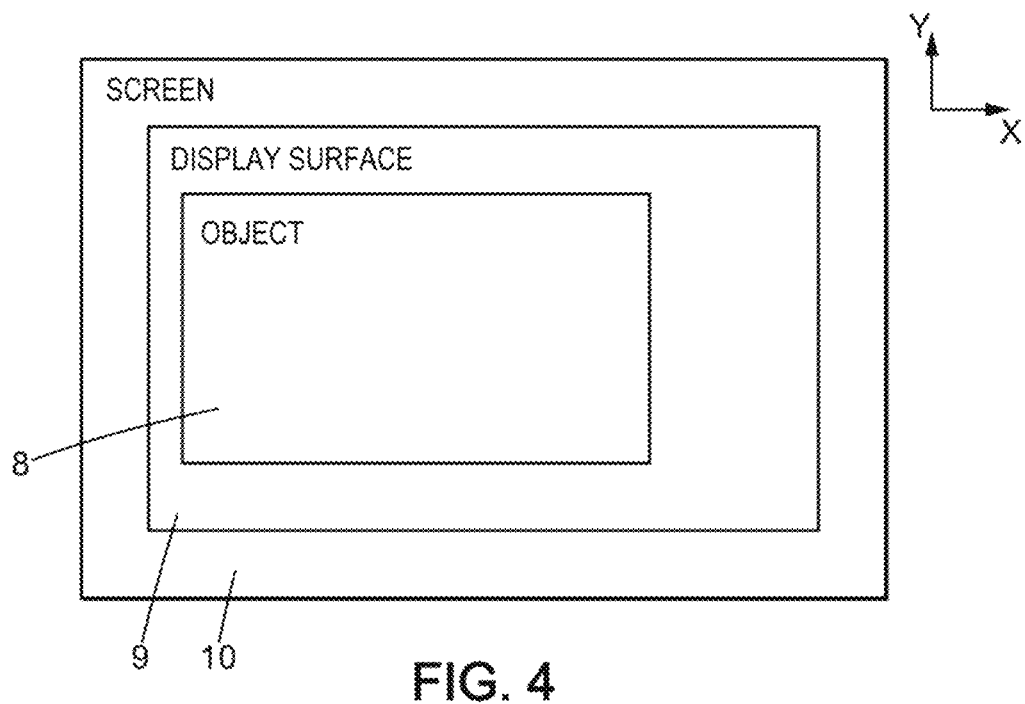
FIG. 4 schematically represents an example of an on-screen display corresponding to a second alternative of a redisplay subsequent to the screen copying method according to one embodiment of the invention.

FIG. 4 schematically represents an example of an on-screen display corresponding to a second alternative of a redisplay subsequent to the screen copying method according to one embodiment of the invention.

After activation of pointer 6, the image portion 2 redisplayed on the screen 10 has disappeared as has pointer 5 which was located in the upper left corner of the image portion 2. Either the image portion 2 is completely covered by the object 8 and will only reappear when the object 8 has disappeared, or it is no longer displayed and will only be redisplayed when the object 8 has disappeared. Similarly, pointer 6 has disappeared. Only the object 8 is displayed on the screen 10.

This object 8 corresponds to pointer 6, and is associated with it. This object 8 may be another image, text, a video, or some other element. This object 8 can be viewed by the user, and it can also be used by the user who could for example activate another pointer located in the displayed object 8 (for example by clicking on it), not shown for reasons of clarity and simplicity in FIG. 4, to display yet another object not shown for reasons of clarity and simplicity in FIG. 4, either on the object 8, wholly or partially covering it, or in place of the object 8.

FIG. 5 schematically represents an illustrative communication between the various elements of a computer system implementing the initial display, the screen copying method according to an embodiment of the invention, and the subsequent redisplay, of a portion of the copied image.

The screen 10 is integrated into a computer system comprising a memory 15, a graphical user interface manager 13 associated with an operating system 14, this graphical user interface manager 13 being adapted to manage displays on the screen 10, and/or another application 12 external to the operating system 14 but also adapted to manage displays on the screen 10. The graphical user interface manager 13 or other application 12 will communicate bidirectionally with the screen 10 and with the memory 15, in order to be able to perform two operations.

The first operation consists of copying into memory 15 an element previously displayed on the screen 10 and then selected by the user for copying. The second operation consists of redisplaying on the screen 10 (or on another screen) an element previously copied into memory 15 after its initial display, for example on the screen 10, and then selection by the user. The element concerned by these two operations is, for example, the image portion 2 and the pointers 5 and 6 that it contains as well as the objects associated with or corresponding to these pointers 5 and 6.

The image portion 2 initially displayed on the screen 10 and then copied into memory 15 after having been selected by the user is, for example, stored in an image file 17, meaning a file in an image format. The image file 17 may be integrated into another document 16, as shown in FIG. 5, or it may not be. The pointers 5 and 6 are stored as metadata 18 which may either be integrated into the image file 17 as shown in FIG. 5 or be stored in other files not shown in FIG. 5 for reasons of clarity and simplicity.

When the user wishes to redisplay the copied image portion 2 with the associated pointers 5 and 6 to enable possible subsequent access to the objects corresponding to these pointers 5 and 6, either the graphical user interface manager 13 or the other application 12 search for the image file 17 in memory 15 in order to redisplay the image portion 2 on the screen 10, and search for metadata 18 in memory 15 in order to redisplay pointers 5 and 6 on the screen. These pointers 5 and 6, which are redisplayed in the redisplayed image portion 2, can be activated by the same type of user selection as was possible when they were initially displayed in the image portion 2 when the image 1 was displayed in its entirety.

Once the image portion 2 is redisplayed, it can be copied again, for example into another document 16 as shown in FIG. 5. This redisplayed image portion 2 could also be copied again by itself, which is not shown in FIG. 5.

Of course the present invention is not limited to the examples and the embodiment described and represented, but is capable of numerous variants accessible to those skilled in the art.

The invention claimed is:

1. A screen copying method comprising:
   copying, as an image file, a portion of an image displayed on a screen where said image portion has been graphically selected by a user, said copying of the selected image portion resulting in:
   automatically, and without user intervention, copying one or more pointers associated with said image portion along with coordinates of the one or more pointers in said image portion, the one or more pointers respectively pointing to objects, and
   automatically, and without user intervention, maintaining respective links between the one or more pointers and the coordinates so that, during a subsequent redisplay of the image portion on the screen, a graphical selection of a point corresponding to one of the coordinates by a user automatically activates a pointer, of the one or more pointers, corresponding to the one respective coordinate of the selected point and brings up an object corresponding to the activated pointer,
   wherein the graphical selecting of the image portion by the user is a capture by the user of an area of the screen displaying the selected image portion,
   the coordinates are relative coordinates with respect to the captured and then redisplayed image portion and which allow for maintaining, automatically, and without user intervention, a correct position of the one or more pointers in the captured image portion even when the one or more pointers is redisplayed with a different size and at a different location than in an initial display as captured on the screen, and
   during a subsequent redisplay of the image portion on the screen, a mapping between the copied coordinates and new coordinates of the redisplay is established, and when there is a change in the position on the screen of an image point, integrating, automatically and without user intervention, the change in the position on the screen of the image portion and an enlargement or a reduction of the image portion.

2. The screen copying method according to claim 1, wherein, after the selection of said image portion by the user, the one or more pointers and the coordinates are identified and copied while traversing all coordinates of the selected image portion.

3. The screen copying method according to claim 1, wherein the one or more pointers, the coordinates, and the respective links are copied as metadata integrated into a structure of the image file containing the selected image portion.

4. The screen copying method according to claim 1, wherein the one or more pointers, the coordinates, and the respective links are copied as metadata external to a structure of the image file containing the selected image portion.

5. The screen copying method according to claim 1, wherein the one or more pointers, the coordinates, and the respective links are stored by a memory in communication with a graphical user interface manager which is able to display the copied image portion on the screen.

6. The screen copying method according to claim 5, wherein, during the graphical selecting by the user of the point in the redisplayed image portion, an application reading the image file informs the graphical user interface manager redisplaying said image portion or another application redisplaying said image portion, of the existence of a pointer of the one or more pointers associated with the selected point.

7. The screen copying method according to claim 1, wherein the one or more pointers are hyperlinks.

8. The screen copying method according to claim 1, wherein the objects are respectively other images to be displayed or other image portions to be displayed.

9. The screen copying method according to claim 1, wherein only the image portion of the displayed image is copied, not the entire displayed image.

10. The screen copying method according to claim 1, wherein the image file contains a color or a grayscale of each pixel of the copied image portion.

11. A non-transitory computer-readable medium, on which is stored a computer program, comprising program code instructions, comprising a computer-readable program configured to capture a copy of the screen according to the screen copying method of claim 1, when said program is run on a computer.

* * * * *